(No Model.)

H. STEVENSON.
SHAFT LIGHTER.

No. 424,144. Patented Mar. 25, 1890.

WITNESSES:
Donn Twitchell
C. Sedgwick

INVENTOR:
H. Stevenson
BY Munn & Co.
ATTORNEYS.

UNITED STATES PATENT OFFICE.

HUGH STEVENSON, OF NEW YORK, N. Y.

SHAFT-LIGHTER.

SPECIFICATION forming part of Letters Patent No. 424,144, dated March 25, 1890.

Application filed May 24, 1889. Serial No. 311,936. (No model.)

*To all whom it may concern:*

Be it known that I, HUGH STEVENSON, of the city, county, and State of New York, have invented a new and Improved Shaft-Lighter, of which the following is a full, clear, and exact description.

The object of this invention is to provide a means for directing the rays of the sun downward upon one spot at all hours between the rising and the setting of the sun; and to the end named the invention consists, essentially, of a frame formed or provided with a practically-continuous reflecting-surface, the frame being bent to horseshoe form and the free ends being adjusted to an angle of about forty-five degrees, the frame being mounted so that its convex end will be toward the north.

Reference is to be had to the accompanying drawings, forming a part of this specification, in which similar figures and letters of reference indicate corresponding parts in both views.

Figure 1:
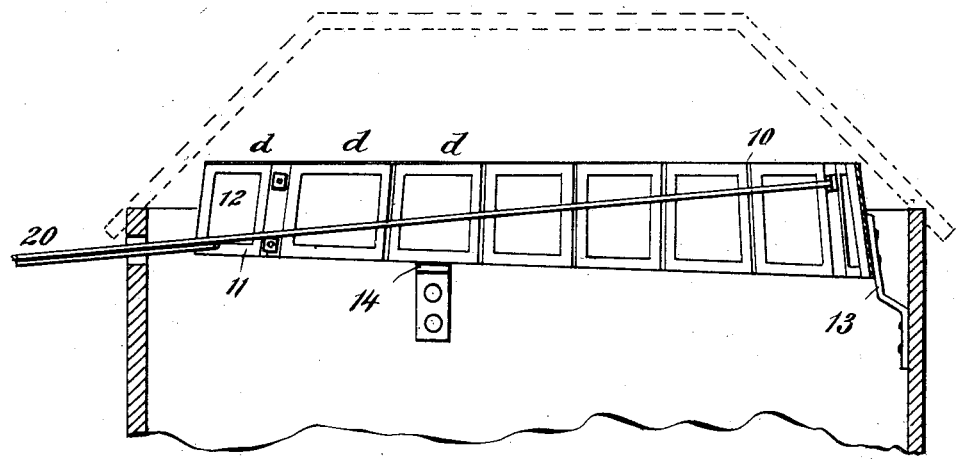
Figure 2:
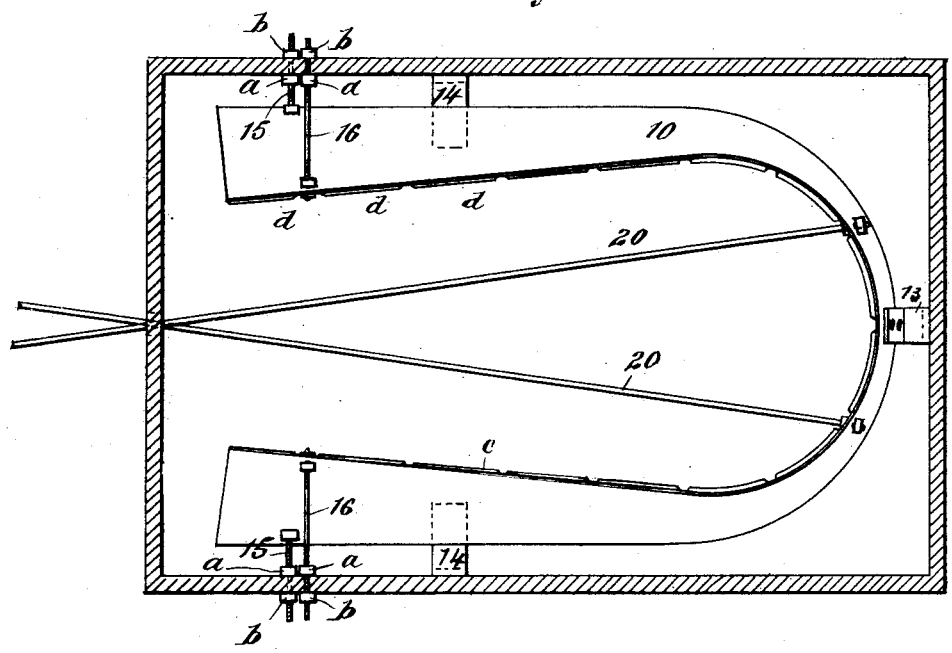

Figure 1 is a central sectional elevation of my improved shaft-lighter, and Fig. 2 is a plan view of the same.

In the drawings, 10 represents a frame one face of which is provided with a series of frames 11, which contain reflecting-surfaces 12. The frame 10 is bent to horseshoe form, and the convex end is supported by a bracket 13, that is held to the walls of the light-shaft, the extending ends of the frame resting loosely upon brackets 14, that are arranged as shown.

To the ends of the frame 10, I secure rods 15 and 16, which carry nuts $a$ and $b$, said rods extending outward through the walls of the light-shaft or through any proper rigid support. In this way I provide for the adjustment of the ends of the frame at an angle of about forty-five degrees, (more or less,) a proper inclination being secured by adjusting the nuts $a$ and $b$, as will be readily understood, the nuts $a$ bearing upon the inside of the wall or the supporting-bracket, while the nuts $b$ bear upon the outside of such wall or bracket.

By means of a lighter constructed as above described the first rays of the sun passing over the edge marked $c$ in Fig. 2 will strike against the reflecting-surfaces 12 at $d\ d\ d$ and will be deflected downward toward the bottom of the shaft. Then, as the sun travels round it will bear successively upon the surfaces 12 until finally, in setting, it strikes upon the surfaces 12 beneath the point $c$.

In the summer the convex end of the frame 10 should be practically vertical; but in winter, owing to the declination of the sun, it is desirable that a slight angle be imparted to said convex end, and to bring about this result I arrange rods 20, which extend outward upon the building to any rigid fixed support, the rods being so proportioned as to length that the average temperature of a winter's day will contract them sufficiently to give the required incline to the convex end of the frame.

Having thus described my invention, I claim as new and desire to secure by Letters Patent—

1. A shaft-lighter consisting of a frame bent to approximately horseshoe shape and provided with a practically-continuous reflecting-surface, the angle of which with the vertical axis of the frame varies from the center of the frame to the ends, substantially as set forth.

2. A shaft-lighter consisting, essentially, of a frame bent to approximately horseshoe form, provided with a practically-continuous flat reflecting-surface, and having its upper edge increasingly inclined inward from the center to the ends, so that said ends stand at an angle of about forty-five degrees, substantially as set forth.

3. In a shaft-lighter, the combination, with a frame 10, provided with reflecting-surfaces 12, of rods 15 and 16 and nuts carried by the rods, substantially as described.

4. The combination, with a frame 10, provided with reflecting-surfaces, substantially as described, of rods 20, as and for the purpose specified.

HUGH STEVENSON.

Witnesses:
EDWARD KENT, Jr.,
C. SEDGWICK.